Dec. 19, 1933.    W. S. HOWE ET AL    1,940,129
GARDEN IMPLEMENT
Filed Dec. 7, 1931
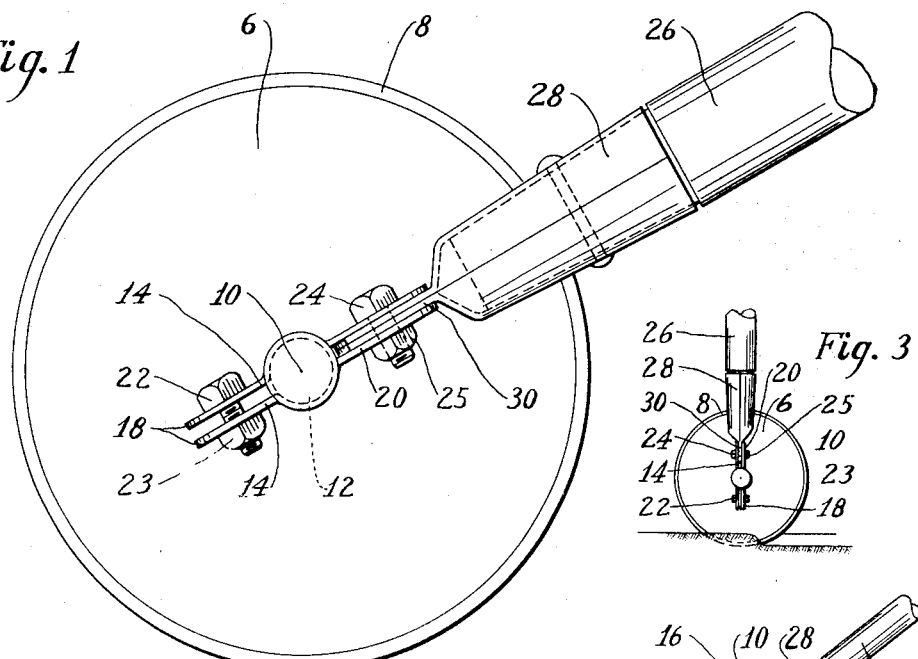
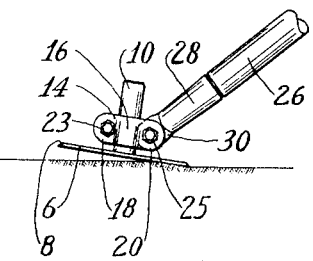
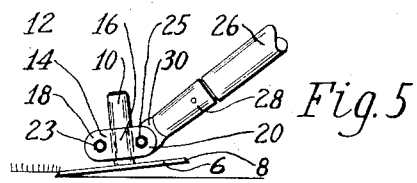
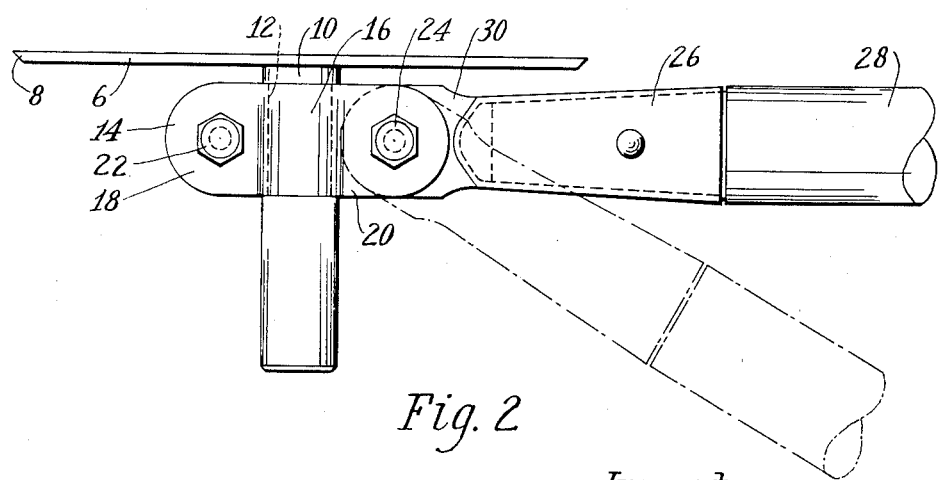
Witness
Ernest A. Myers
Inventors
William S. Howe
Henry F. Causebrook
by their attorneys
Van Everen, Fish, Hildreth & Cary Patented Dec. 19, 1933

1,940,129

UNITED STATES PATENT OFFICE 1,940,129

GARDEN IMPLEMENT

William S. Howe, Hinsdale, N. H., and Henry F. Causebrook, Greenfield, Mass., assignors to Granite State Mowing Machine Co., Hinsdale, N. H., a corporation of New Hampshire Application December 7, 1931. Serial No. 579,480

2 Claims. (Cl. 306—11)

The present invention relates to garden implements.

The object of the present invention is to provide an implement which is adapted for use both as a turf edger and also as a garden weeder, which shall be of simple and rugged construction and which may be easily adjusted for varying conditions of work and the convenience of the operator.

To this end, the invention comprises the implement hereinafter described and particularly defined in the claims.

In the accompanying drawing, Fig. 1 is a side elevation of the preferred form of the invention, as used for edging turf; Fig. 2 is a plan view of the implement; Fig. 3 is a view illustrating one mode of use of the implement as an edger; Fig. 4 is a view illustrating the use of the implement as a weeder when adjusted for use with drawing strokes; and Fig. 5 is the corresponding view when adjusted for use with pushing strokes.

The illustrated embodiment of the invention comprises a circular tool or disk 6 having a beveled edge 8. Secured to the center of the disk is a stud 10 which extends outwardly a sufficient distance to permit application of foot pressure for edging. The portion of the stud near the disk is recessed or turned to smaller diameter than the remainder of the stud, as indicated in dotted outline at 12.

The tool or disk 6 is mounted in a support or clamp comprising two identical sheet metal pieces 14. Each of these pieces has an arc-shaped portion 16 partially embracing the reduced portion 12 of the stud 10 and outwardly extending wing portions 18 and 20. The two members of the support or clamp are secured about the stud by means of bolts 22 and 24 with clamping nuts 23 and 25. A handle 26 is secured to the clamp by means of a socket 28 of usual form having a pressed end flange 30 received between the wing portions 20 of the two clamp pieces.

The clamp performs the double function of providing for the angular adjustment of the handle and also of permitting or preventing rotational movement of the disk as may be desired, with respect to the stud. Thus, by loosening the clamping nut 25 or the bolt 24, the handle may be adjusted into any angular position according to the character of the work or to suit the convenience of the operator, as shown in Fig. 2, and then locked in the adjusted position by tightening the nut. The nut 23 or bolt 22, when tightened, locks the circular portion 16 of the clamp to the stud and thereby prevents rotation of the latter. By slightly loosening the nut, rotation of the disk is permitted, the clamp pieces then acting as a bearing for the reduced portion of the stud.

The implement may be used as an edger with the disk either free or clamped. Preferably, the handle in either case is adjusted perpendicular to the axis of the stud 10, as shown in Figs. 2 and 3. When used with the disk free, that is, with the bolt 22 slightly loosened, the implement is pushed or pulled by the operator, the disk being then free to rotate so that it cuts through the turf. This mode of operation is particularly useful for edging soft turf which permits rapid actuation of the knife. For cutting or edging heavier turf, the disk is preferably locked by tightening the bolt 22 and the device is placed as shown in Fig. 3, with the handle vertical. The protruding end of the stud is then used as a foot pressure piece to cut through the turf. When used in this manner, the disk may be from time to time adjusted rotationally to different positions to bring new and sharper portions of the disk into action and equalize the wear on the beveled edge.

The implement is used as a weeder with the disk in a nearly horizontal plane, as shown in Figs. 4 and 5. In such cases, the handle is angularly adjusted with respect to the stud, and the disk is locked to the stud to give the desired slight inclination of the disk to the surface of the ground and to bring the handle at a convenient angle and height for the operator. When, as shown in Fig. 4, the implement is to be operated with a drawing stroke to cut under the weeds, the disk is inclined downwardly to the rear. When, as illustrated in Fig. 5, the implement is to be used with a pushing stroke, the disk will be inclined slightly downwardly toward the front. In both conditions of use, the handle may be brought to the desired position or height to suit the operator.

Having thus described the invention, what is claimed is:

1. A garden implement comprising a disk, a stud secured to the disk, a two-part clamp each having a portion partly encircling the stud, a handle, means for adjustably securing the handle between the two parts of the clamp, and means for adjusting the clamping pressure of the clamp on the stud independently of the adjustment of the handle.

2. A garden implement comprising a disk, a stud attached to the disk, a two-part clamp encircling the stud, a handle secured to the clamp, means for adjusting the angle of the handle with respect to the stud independently of the pressure between the clamp and the stud, and means for adjusting the pressure between the clamp and the stud independently of the adjustment of the handle.

WILLIAM S. HOWE.
HENRY F. CAUSEBROOK.